United States Patent Office 3,432,531
Patented Mar. 11, 1969

3,432,531
PROCESS FOR PREPARATION OF
ALKYLTIN COMPOUNDS
Joseph G. Natoli, Parlin, N.J., assignor to M & T
Chemicals Inc., New York, N.Y., a corporation of
Delaware
No Drawing. Filed June 16, 1964, Ser. No. 375,665
U.S. Cl. 260—429.7                               18 Claims
Int. Cl. C07f 7/22

ABSTRACT OF THE DISCLOSURE

In accordance with certain of its aspects, the novel process of this invention for preparing an alkyl organotin compound by the reaction of an alkyl halide, magnesium, and tin tetrahalide may comprise maintaining a reaction mixture containing less than all of said alkyl halide, adding to said reaction mixture in amount substantially equivalent to said alkyl halide, adding ether-catalyst to said reaction mixture in amount of 5–75 mole percent of the alkyl halide, adding to said reaction mixture the remainder of said alkyl halide together with tin tetrahalide in total amount of about 1 mole per 3.4–5.1 moles of total alkyl halide, and agitating said reaction mixture during said addition whereby said reaction mixture is maintained substantially uniform thereby forming a high yield of alkyl organotin compounds.

This invention relates to a novel process for preparing organotin compounds. More particularly, it relates to a process characterized by improved yields of selected products.

Prior attempts to produce organotin compounds, typified by triorganotin compounds $R_3SnX$ and $R_4Sn$, have included those wherein an appropriate Grignard reagent has been reacted with tin tetrahalide according to the following reaction:

$$3RMgX + SnX_4 \rightarrow R_3SnX + 3MgX_2 \quad (1)$$

In the course of this reaction as commonly carried out, the yield of selected products such as $R_3SnX$ may be less than stoichiometric because inter alia of the production of by-products including $RSnX_3$, $R_2SnX_2$, and $R_4Sn$.

Although it may be possible to attain high conversion to organotin product and to attain high tin yields, the reactions carried out in this manner are less than fully satisfactory. It is found that the two-step processing required, including reaction, workup and solvent recovery, imposes a heavy economic burden on the process arising from increased cost of raw materials as well as the added expense of the processing steps.

Accordingly, attempts have been made to prepare organotin products in economical yield by various modifications of this process in an attempt to decrease the amount and cost of raw materials needed and the processing difficulties.

Although certain of these alternative processes may be economically employed to produce specific products, it has been found that efficient production of organotin compounds containing alkyl groups, especially those containing less than about 20 carbon atoms in the alkyl moiety, e.g., octyltin compounds, has been difficult by prior art processes.

It is an object of this invention to provide a process for production of organotin compounds in high yields. More specifically, it is an object of this invention to provide a process for economically preparing alkyl organotin halides. Other objects will be apparent to those skilled in the art from inspection of the following description.

In accordance with certain of its aspects, the novel process of this invention for preparing an alkyl organotin compound by the reaction of an alkyl halide, magnesium, and tin tetrahalide comprises maintaining a reaction mixture containing less than all of said alkyl halide, adding to said reaction mixture magnesium in amount substantially equivalent to said alkyl halide, adding ether-catalyst to said reaction mixture in the amount of 5–75 mole percent of the alkyl halide, adding to said reaction mixture the remainder of said alkyl halide together with tin tetrahalide in total amount of about one mole per 3.4–5.1 moles of total alkyl halide, and agitating said reaction mixture during said addition whereby said reaction mixture is maintained substantially uniform thereby forming a high yield of alkyl organotin compounds.

In accordance with a preferred aspect of this invention, the novel process for preparing alkyl organotin compounds by the reaction of alkyl halide, magnesium, and tin tetrahalide in molar ratio of 3.7:3.7:1 may comprise maintaining a reaction mixture containing said magnesium and 15–40% of said alkyl halide; simultaneously adding to said reaction mixture in independent streams the remainder of said alkyl halide and said tin tetrahalide in molar ratio of 3.7:1; agitating said reaction mixture during said addition whereby said reaction mixture is maintained substantially uniform; and adding to said reaction mixture the remainder of said tin tetrahalide thereby forming a high yield of said alkyl organotin compound.

The organotin product which may be formed in high yield by practice of this invention may include products having the formula $R_aSnX_{4-a}$ wherein $a$ may be an integer 1–4; thus the products formed may have the formula $RSnX_3$, $R_2SnX_2$, $R_3SnX$, and $R_4Sn$. X may preferably be halide and most preferably chloride or bromide.

It is found that the process of this invention may be particularly effective and find its greatest use in the production of compounds wherein R is an alkyl group. Alkyls containing less than about 20 carbon atoms may be the most readily available commercially, but higher alkyls may be employed. It may be preferred to use R groups containing less than about 13 carbon atoms, e.g., methyl, ethyl, propyl, butyl, amyls, hexyls, octyls, decyls, and dodecyls. In a highly preferred embodiment of the invention, it is found that particularly outstanding results may be obtained when the R group is n-octyl.

Typical specific products which may be formed by the process of this invention may include the following illustrative compounds:

Methyltin trichloride; ethyltin trichloride; n-butyltin trichloride; isobutyltin trichloride; n-amyltin trichloride; n-hexyltin trichloride; n-octyltin trichloride; 2-ethyl hexyltin trichloride; dodecyltin trichloride; n-butyltin tribromide; n-amyltin tribromide; n-hexyltin tribromide; n-octyltin tribromide; 2-ethyl hexyltin tribromide; dodecyl-tin tribromide; di-ethyltin dichloride; di-n-butyltin dibromide; di-n-amyltin dichloride; di-n-hexyltin dichloride; di-n-octyltin dichloride; di-2-ethyl hexyltin dichloride; di-dodecyltin dichloride; di-n-octadecyltin dichloride; tri-n-butyltin chloride; tri-n-amyltin chloride; tri-n-hexyltin chloride; tri-n-hexyltin bromide; tri-n-octyltin chloride; tri-2-ethyl hexyltin chloride; tri-n-octadecyltin chloride; tetra-n-butyltin; tetra-n-amyltin; tetra-n-hexyltin; tetra-n-octyltin; tetra-n-dodecyltin; and tetra-n-ocadecyltin.

The tin tetrahalide which may be used in practice of this invention may be $SnX_4$, wherein X may be an active halide selected from the group consisting of chloride and bromide. Preferably $SnX_4$ may be tin tetrachloride, $SnCl_4$.

The alkyl halide which may be used in practice of this invention may be a compound RX wherein R may be the groups noted supra; typically R may be alkyl having less than about 20 carbon atoms, preferably alkyl groups having less than about 13 carbon atoms, and most preferably n-octyl. X may be the halide noted supra, e.g., chloride or bromide. The most preferred alkyl halide may be n-octyl chloride.

The magnesium metal which may be used in practice of this invention may be magnesium metal in lump form, in ribbon form, in billet form, in powder form, as turnings, etc. Preferably in laboratory practice, it may be in ribbon form. In commercial installations, it may be in the form of turnings.

The ether which may be used as catalyst in this reaction as hereinafter set forth may be an aliphatic ether such as diethyl ether, di-n-butyl ether, etc., or any of the compounds hereinafter described which are designated Q for purpose of convenience.

The compound Q, as this expression is used herein for the purpose of brevity, includes cyclic ethers containing 5–6 members in the ring with at least one hydrogen atom attached to each carbon atom in the ring and having the formula:

wherein X is a methylene group or an N-alkyl group; R″ is an unsubstituted saturated divalent aliphatic hydrocarbon radical; R′ is an ethylene radical, an ethylenically unsaturated divalent hydrocarbon radical, a methylene radical, or =CHR‴, (R‴ being hydrogen or an aliphatic radical); and O is oxygen. When X is N-alkyl, the ring shall contain 6 members with X and O in a position 1:4 with respect to each other.

Compounds within this definition include tetrahydrofuran, tetrahydropyran, 2-methyltetrahydrofuran, 2-ethoxytetrahydropyran, tetrahydrofurfuryl ethyl ether, dihydropyran, and N-methylmorpholine. The compound Q may bear as substituent, inert groups, i.e., groups which are not reactive either with organomagnesium halides or with any of the components and products of the reaction mixtures of the present process. Illustrative inert substituents may include substituted and unsubstituted alkyl, aryl, alkoxy, and aryloxy groups (including those bearing substituents thereon which are unreactive to other components of the reaction mixture as herein specified). Where nitrogen replaces a carbon atom in the ring at X, the nitrogen atom must be substituted with a group, such as an alkyl group, which is unreactive to the reactants or reaction products.

It is a characteristic of compound Q that the oxygen is available for electron donation, i.e., the free $\pi$-electrons present on the oxygen are available for coordination with the Grignard reagent. Any large blocking groups on the carbon atoms adjacent to the ring oxygen may impair the availability of these electrons and the reactivity of the compound for forming a complex and assisting in the reaction. In addition to the compounds listed above as being suitable for compound Q, other equivalent compounds satisfying the requirements for this complexing agent and solvent will be apparent to those skilled-in-the-art from the present specification. A compound Q which has a high melting point may be used in practice of this invention, but those having a very high melting point (e.g. above 90° C.) may preferably be used with a hydrocarbon diluent or solvent.

The inert hydrocarbon solvent which may preferably be used in practice of this invention may be a hydrocarbon solvent having a boiling point of 60°–200° C. Typical hydrocarbon solvents which may be employed as reaction medium may include benzene, toluene, xylene, cyclohexane, heptane, octane, including commercially attainable mixtures which may include one or more of these.

In practice of this invention, the reaction between the alkyl halide and the tin tetrachloride may typically be as follows, this reaction being illustrative of one wherein it is desired to produce maximum yields (based on R and on $SnCl_4$) of organotin compounds:

$$3.7RX + 3.7Mg + SnX_4 \rightarrow R_4Sn$$
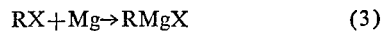
$$+ R_3SnX + R_2SnX_2 + MgX_2 \quad (2)$$

This reaction may be carried out by adding to a reaction vessel 15–40 mole percent, preferably about 33.3 mole percent of the alkyl halide to be used in the reaction. Preferably this may be added in the form of a solution of alkyl halide in inert hydrocarbon and the preferred solution may contain 30–60%, preferably 54% by weight of alkyl halide in the inert hydrocarbon solvent. Preferably there may then be added to the reaction mixture magnesium metal in amount substantially equivalent to the total amount of alkyl halide to be used in the reaction.

There may preferably be added to the reaction mixture at this time ether as hereinbefore described including either the aliphatic ethers or those falling within the scope of the compound Q formula. The ether added at this point may be added in catalytic amount typically 5–75 mole percent of the alkyl halide and preferably 5–50 mole percent, most preferably in amount of 13.5 mole percent of the total alkyl halide. It is a particular advantage of this invention that the amount of ether employed may be substantially less than one mole per mole of alkyl halide.

The reaction mixture so formed may preferably be heated to 50–100° C., say 70° C. for 10–30 minutes, preferably 20 minutes during which time the catalyst-ether present may initiate the reaction between the magnesium metal and the alkyl halide to form Grignard reagent by the following reaction:

$$RX + Mg \rightarrow RMgX \quad (3)$$

To the preferably well-agitated reaction mixture, there may then be added preferably simultaneously (a) the remainder of the alkyl halide in hydrocarbon solvent containing 5–50 mole percent, say 13.5 mole percent ether and (b) tin tetrahalide typically in the form of a 50–90%, preferably 70% solution in hydrocarbon solvent. Preferably the hydrocarbon solvents used in the several streams and the reaction mixture may be the same hydrocarbon and most preferably a commercial hydrocarbon solvent which may contain substantial proportions of heptane and other near-boiling hydrocarbons, e.g., that sold under the trademark Solvent 210.

As 50–75%, say 66% of tin tetrahalide and the remainder of the alkyl halide are added to the reaction mixture, preferably in the form of independent streams, the rate of addition may preferably be controlled so that these streams are added in molar ratio of about 3.4–5:1. When it is desired to prepare as product $R_4Sn$, typically tetra-n-octyltin, the ratio will preferably be 4.2–5:1, say 4.7:1. This will permit attainment of stoichiometric yields of $R_4Sn$ with yield based on alkyl values of 80–85%, say 82%. Attainment of maximum yield, based on alkyl yield and tin yield, may be effected by use in the preferred embodiment of a mole ratio of about 3.4–4, preferably 3.7 moles of alkyl halide per mole of tin tetrahalide. Thus, at any given time, the preferred reaction mixture may be thought of as being formed from one mole of tin tetrahalide plus 3.7 moles of alkyl halide plus the 0.55–1.5, say 1.22 moles of alkyl halide present in the initial mixture—together with ether-catalyst, magnesium, and hydrocarbon solvent. Preferably the reaction mixture, during the simultaneous addition of the two streams, may be maintained at gentle reflux temperature, typically 75–115° C. (when the refluxing liquid includes, e.g., heptane) for 30–240 minutes, typically 120 minutes.

When all of the alkyl halide has been added to the reaction mixture, the remainder of the tin tetrachloride, typically 25–40 mole percent, say 33 mole percent may thereafter be added to the reaction mixture with agitation.

After all of the reactants have been added to the reaction system, the reaction mixture may preferably be agitated, for 2–6 hours, preferably 5 hours at temperature of 90–115° C., and preferably at gentle reflux typically at 100° C.

During this period, it will be found that maximum conversion of alkyl halide to organotin compounds will be attained. At the end of the noted reaction time, the reaction may be cooled to 30–40° C., say 30° C. Hydrolysis of the reaction mixture may be effected by diluting the mixture at 30–40° C., with water, preferably containing electrolyte such as sulfuric acid in the amount of 1–15%, say 10% by weight.

Typically hydrolysis of the reaction mass, at 30–40° C., may be effected by mixing with 400–740, say 500, parts by weight of water, preferably followed by the addition of electrolyte, such as 10% sulfuric acid, in an amount of 300–600, say 500 parts. The organic layer which separates may be separated as by decantation.

In accordance with certain aspects of this invention, the organic layer may be stripped of solvent as by distillation. Preferably distillation may be effected at atmospheric pressure for 120–240 minutes, say 180 minutes to pot temperature of 115–185° C., typically 125° C. The reaction mixture may be further distilled at pressure of 10–55 mm. Hg, typically 25–50 mm. Hg, to a final pot temperature of about 115–185° C., say 125° C.

The residue produced in this manner may be an organotin mixture containing 80–100%, typically 94% by weight of organotin compounds—this representing a yield, based on tin, of 80–100%, say 98%. Based upon the alkyl halide, the yield may typically be 60–95%, say 88%.

Analysis of this crude organotin mixture may typically indicate that it may contain the following components.

Component: Percent composition
  $R_4Sn$ _____ 20–40, say 30
  $R_3SnX$ _____ 40–80, say 65
  $R_2SnX_2$ _____ 0–13, say 5

It is a particular feature of this invention that organotin compounds may be prepared in extremely high yields and at high levels of purity. In particular it is a feature of this invention that, because of the method of formation of these compounds which employs a minimum of ether-catalyst and hydrocarbon solvents, the organotin products may readily be recovered.

It is also a particular feature of the reaction mixtures prepared by the process of this invention that the several compounds may readily and easily be separated or, in the alternative, the crude organotin mixture may be subjected to other reactions without further preliminary treatment. These reactions may include conversion of the entire mixture to other desired organotin products or redistribution of the components of the mixture to form higher yields of selected products.

Practice of this invention may be observed by reference to the following illustrative examples wherein all parts noted are parts by weight unless otherwise specified.

EXAMPLE 1

In this example which represents practice of the invention, n-octyltin compounds may be prepared by charging 359.6 parts of magnesium turnings to a reaction vessel which may be purged with nitrogen. 426 parts of commercial heptane may be added together with an initiation mixture containing 118.6 parts of diethyl ether, 59.5 parts of n-octyl chloride, and 61.8 parts of n-octyl bromide with good agitation. To the reaction mixture, initiated by heating to 65° C., may be added 33% of a mixture consisting of 2093 parts of octyl chloride, 177.8 parts of diethyl ether, and 1764 parts of commercial heptane. During the addition, external heating may be applied and maintained until the temperature rises to 94° C. Thereafter reaction may proceed exothermically with pot temperature reaching as high as 100° C. over the course of 45 minutes.

Then there may be added to the reaction vessel over 2.5 hours, (a) the balance of the solution containing the octyl chloride and (b) 66% of a solution containing 1042 parts of tin tetrachloride and 426 parts of commercial heptane. During this time, the rate of addition of the octyl chloride solution and the tin tetrachloride solution may be controlled so that the molar ratio of octyl chloride to tin tetrachloride, as added, is approximately 3.7–1.

At the end of this time, the remaining tin tetrachloride solution, 389 parts, may be added over approximately 40 minutes. The reaction mixture may then be maintained at 92–99° C., gentle reflux, for 5 hours. The reaction mixture may then be cooled to 30–35° C. and mixed with 1500 parts of water. The oil which may be formed may be decanted to leave solid magnesium chloride hexahydrate. The latter may be dissolved with 1000 parts of water and acidified with 1000 parts of 10% sulfuric acid. On stirring, an additional organic layer may separate. This may be decanted and combined with the organic layer earlier obtained.

The combined organic layer may be stripped of solvent by atmospheric pressure distillation to a pot temperature of 125° C., followed by vacuum distillation at 25–50 mm. Hg to a final pot temperature of 125° C.

2185 parts of amber colored oil may remain from this distillation. The octyltin compounds thus obtained, on analysis may be found to contain the following, expressed in terms of weight percent yield.

Tetraoctyltin _____ 27.3
Trioctyltin chloride _____ 64.9
Dioctyltin dichloride _____ 0.6

Analysis further indicates an octyl yield of 87.94% and a tin yield of 98.87%.

EXAMPLE 2

In this example which represents practice of the invention, n-amyltin compounds may be prepared by charging 44.9 parts of magnesium turnings to a reaction vessel which may be purged with nitrogen. 50 parts of commercial heptane may be added together with an initiation mix containing 513 parts of n-amyl chloride, 6 parts of n-amyl bromide, and 18.5 parts of diethyl ether with agitation. To the reaction mixture, which may be initiated by heating to 55–60° C., is added 33% of a solution consisting of 187.6 parts of n-amyl chloride, 227 parts of commercial heptane, and 18.5 parts of diethyl ether. During the addition, external heating may be applied until the temperature rises to 86° C. Thereafter reaction may proceed exothermically with pot temperature reaching as high as 93° C. over the course of 20 minutes.

Then there may be added to the reaction vessel over 40 minutes, (a) the balance of the solution containing the amyl chloride and (b) 66% of a solution containing 130 parts of tin tetrachloride and 50 parts of commercial heptane. During this time, the rate of addition of the amyl chloride solution and the tin tetrachloride solution may be controlled so that the molar ratio of amyl chloride to tin tetrachloride as added is approximately 3.7–1. At the end of this time the remaining tin tetrachloride reaction, 60 parts may be added over 15 minutes.

Tthe reaction mixture may be maintained at 90–96° C., gentle reflux, for 5 hours. The reaction mixture may then be cooled to 30–35° C., mixed with 200 parts of water, and acidified with 300 parts of 10% sulfuric acid. On stirring, an oil layer may separate. This may be decanted.

The organic layer may be stripped of solvent by vacuum distillation at 25–35 mm. Hg to a final pot temperature of 125° C.

192 parts of amber colored oil may remain. On analysis for the content of amyltin compounds, the oil may be found to contain the following expressed in terms of weight percent yield:

| | |
|---|---|
| Tetraamyltin | 22.83 |
| Triamyltin chloride | 68.42 |
| Diamyltin dichloride | 3.62 |

Analysis may further indicate an amyl yield of 85% and a tin yield of 98%.

EXAMPLE 3

In this example which represents practice of the invention, n-dodecyltin compounds may be prepared by charging 44.9 parts of magnesium turnings to a reaction vessel which may be purged with nitrogen. 50 parts of commercial heptane may be added together with an initiation mix containing 10.5 parts of commercial lauryl chloride, 9.9 parts of lauryl bromide, and 18.5 parts of diethyl ether with agitation. To the reaction mixture, initiated by heating to 65–70° C., may be added 33% of a solution consisting of 370.1 parts of commercial lauryl chloride, 327 parts of commercial heptane, and 18.5 parts of diethyl ether. During the addition, external heating may be applied until the temperature rises to 95° C. over the course of 20 minutes.

Then there may be added to the reaction vessel over 40 minutes, (a) the balance of the lauryl chloride solution and (b) 66% of a solution containing 136 parts of tin tetrachloride and 50 parts of commercial heptane. During this time the rate of addition of the lauryl chloride solution and the tin tetrachloride reaction may be controlled so that the molar ratio of lauryl chloride to tin tetrachloride may be added in approximately 3.7–1.

At the end of this time the remaining tin tetrachloride, 60 parts, may be added over 10 minutes. The reaction mixture may be maintained at 90–96° C., gentle reflux, for 5 hours. The reaction mixture may be cooled to 30–35° C., mixed with 200 parts of water and 300 parts of 10% sulfuric acid. On stirring an oil layer may separate. This may be decanted.

The organic layer may be stripped of solvent by vacuum distillation at 25–35 mm. Hg to a final pot temperature of 135° C. 402 parts of brown colored oil may remain. Analysis for the content of lauryltin compounds may be found to contain the following expressed in terms of weight percent yields.

| | |
|---|---|
| Tetralauryltin | 25.08 |
| Trilauryltin chloride | 47.43 |
| Dilauryltin dichloride | 3.36 |

Analysis may further indicate a 78.6% lauryl yield and a 88.2% tin yield.

EXAMPLE 4

In this example which represents practice of the invention, n-octadecyltin compounds may be prepared by charging 44.9 parts of magnesium turnings to a reaction vessel which may be purged with nitrogen. 50 parts of commercial petroleum distillate (B.P. 115–143° C.) may be added together with an initiation mix containing 13.3 parts of octadecyl bromide, 14.4 parts of octadecyl chloride, and 18.5 parts of diethyl ether with agitation. To the reaction mixture, initiated by heating to 75–80° C., may be added 33% of a solution consisting of 508.6 parts of octadecyl chloride, 230 parts of commercial petroleum distillate (B.P. 115–143° C.), and 18.5 parts of diethyl ether. During the addition external heating may be applied until the temperature rises to 90° C. Thereafter the reaction may proceed exothermically with temperature reaching as high as 106° C. over the course of 20 minutes.

Then there may be added to the reaction vessel over 45 minutes, (a) the balance of the solution containing octadecyl chloride and (b) 66% of a solution containing 130 parts of tin tetrachloride and 50 parts of commercial petroleum distillate (B.P. 115–143° C.). During this time the rate of addition of the octadecyl chloride solution and the tin tetrachloride solution may be controlled so that the molar ratio of octadecyl chloride to tin tetrachloride is 3.7–1.

At the end of this time the remaining tin tetrachloride solution, 60 parts, may be added over 15 minutes. The reaction mixture may be maintained at 115–120° C., gentle reflux for 5 hours. The reaction mixture may then be cooled to 30–35° C. and hydrolyzed by pouring into 600 parts of 5% sulfuric acid and agitated. An oil may separate and may be decanted.

The organic layer may be stripped of solvent by vacuum distillation at 20–30 mm. Hg to a final pot temperature of 175° C. 560 parts of brown colored oil remains which may solidify on cooling. Analysis of the octadecyltins may show a 65.0% octadecyl yield and an 84.6% tin yield.

EXAMPLE 5

In this example which represents practice of the invention to attain maximum yield of tetraoctyltin, 134.6 parts of magnesium turnings may be charged to a reaction vessel which may be purged with nitrogen. 153 parts of commercial heptane may be added together with an initiation mix containing 51.5 parts of diethyl ether, 23.1 parts of octyl bromide, and 23.3 parts of octyl chloride with good agitation. To the reaction mixture initiated by heating to 65° C., is added 33% of a solution containing 785 parts of octyl chloride, 70 parts of diethyl ether, and 634 parts of commercial heptane. During the addition, heating may be applied and maintained until the temperature is raised to 94° C. Thereafter reaction may proceed exothermically with pot temperature reaching as high as 96° C. over the course of 15 minutes.

Then there may be added to the reaction vessel over 2 hours, (a) the balance of the solution containing the octyl chloride, and (b) 66% of a solution containing 304 parts of tin tetrachloride and 153 parts of commercial heptane. During this time, the rate of addition of the octyl chloride solution and the tin tetrachloride solution may be controlled so that the molar ratio of octyl chloride to tin tetrachloride, as added is approximately 4.7–1. At the end of this time, the remaining tin tetrachloride solution, 152 parts, may be added over approximately 35 minutes. The reaction may then be maintained at 92–99° C., gentle reflux, for 4 hours. The reaction mixture may then be cooled to 30–35° C. and mixed with 520 parts of water. The oil which may be formed may be decanted to leave solid magnesium chloride hexahydrate. The latter may be dissolved with 500 parts of water and acidified with 250 parts of 10% sulfuric acid. On stirring, an additional oil layer may separate. This may be decanted and combined with the organic layer earlier obtained.

The combined organic layer may be stripped of solvent by vacuum distillation at 40–50 mm. Hg to a final pot temperature of 135° C. 710 parts of amber colored oil remain. Analysis of the octyltin compounds may be found to contain the following expressed in terms of weight percent yield:

| | |
|---|---|
| Tetraoctyltin | 87.93 |
| Trioctyltin chloride | 0.35 |
| Dioctyltin dichloride | 0.03 |

Analysis further indicated an octyl yield of 82.9% and a tin yield of 100%.

Although this invention has been disclosed by reference to various specific examples, it will be apparent to those skilled in the art that various modifications and changes may be made thereto which fall within the scope of this invention.

I claim:

1. In the process for preparing an alkyl organotin compound by the reaction of an alkyl halide, magnesium, and tin tetrahalide, the improvement which comprises maintaining the reaction mixture containing less than all of said alkyl halide, adding to said reaction mixture magnesium in amount substantially equivalent to said total amount of alkyl halide to be used, adding ether-catalyst to said reaction mixture in the amount of 5–75 mole percent of the alkyl halide, adding to said reaction mixture the remainder of said alkyl halide together with tin tetrahalide in total amount of about one mole per 3.4–5.1 moles of total alkyl halide, and agitating said reaction mixture during said addition whereby said reaction mixture is maintained substantially uniform thereby forming a high yield of alkyl organotin compounds.

2. The process for preparing an alkyl organotin compound as claimed in claim 1 wherein said ether-catalyst is selected from the group consisting of tetrahydrofuran, tetrahydropyran, 2-methyl tetrahydrofuran, 2-ethoxytetrahydropyran, tetrahydrofurfuryl ether, dihydropyran, and N-methyl morpholine.

3. The process for preparing an alkyl organotin compound as claimed in claim 1 wherein said ether-catalyst is diethyl ether.

4. The process for preparing an alkyl organotin compound as claimed in claim 1 wherein said ether-catalyst is di-n-butyl ether.

5. The process for preparing an alkyl organotin compound as claimed in claim 1 wherein said alkyl is octyl.

6. The process for preparing an alkyl organotin compound as claimed in claim 1 wherein said reaction mixture includes inert hydrocarbon solvent.

7. The process for preparing an alkyl organotin compound as claimed in claim 1 wherein said reaction mixture includes heptane as inert hydrocarbon solvent.

8. The process for preparing an alkyl organotin compound as claimed in claim 1 wherein the ratio of alkyl halide to tin tetrahalide in said reaction mixture is 3.4–4 to 1.

9. The process for preparing an alkyl organotin compound as claimed in claim 1 wherein the ratio of alkyl halide to tin tetrahalide in said reaction mixture is 3.7.

10. The process for preparing an alkyl organotin compound as claimed in claim 1 wherein the ratio of alkyl halide to tin tetrahalide in said reaction mixture is 4.2–5.1 to 1.

11. The process for preparing an alkyl organotin compound as claimed in claim 1 wherein the ratio of alkyl halide to tin tetrahalide in said reaction mixture is 4.7.

12. In the process for preparing an alkyl organotin compound by the reaction of an alkyl halide, magnesium, and tin tetrahalide, the improvement which comprises maintaining a reaction mixture containing less than all of said octyl chloride, adding to said reaction mixture magnesium in amount substantially equivalent to said total amount of octyl chloride to be used, adding ether-catalyst to said reaction mixture in the amount of 5–75 mole percent of the octyl chloride, adding to said reaction mixture the remainder of said alkyl halide together with tin tetrachloride in total amount of about one mole per 3.7 moles of total octyl chloride, and agitating said reaction mixture during said addition whereby said reaction mixture is maintained substantially uniform thereby forming a high yield of octyl organotin compounds.

13. The process for preparing an alkyl organotin compound by the reaction of alkyl halide, magnesium, and tin tetrahalide in molar ratio of 3.4–4:3.4–4:1 which comprises maintaining a reaction mixture containing said magnesium and 15–40% of said alkyl halide; adding ether-catalyst to said reaction mixture; simultaneously adding to said reaction mixture in independent streams the remainder of said alkyl halide and said tin tetrahalide in mole ratio of 3.4–4:1; agitating said reaction mixture during said addition whereby said reaction mixture is maintained substantially uniform; and adding to said reaction mixture the remainder of said tin tetrahalide thereby forming a high yield of said alkyl organotin compound.

14. The process for preparing an alkyl organotin compound as claimed in claim 13 wherein said alkyl is octyl.

15. The process for preparing an alkyl organotin compound as claimed in claim 13 wherein said ether-catalyst is di-n-butyl ether.

16. The process for preparing a lower alkyl organotin compound as claimed in claim 13 wherein said reaction mixture includes inert hydrocarbon solvent.

17. The process for preparing an alkyl organotin compound as claimed in claim 13 wherein the ratio of alkyl halide to tin tetrahalide is 3.7:1.

18. The process for preparing an alkyl organotin compound by the reaction of alkyl halide, magnesium and tin tetrahalide in molar ratio of 3.7:3.7:1 which comprises maintaining a reaction mixture containing said magnesium and 15–40% of said alkyl halide; adding ether-catalyst to said reaction mixture; simultaneously adding to said reaction mixture the remainder of said alkyl halide and said tin tetrahalide in mole ratio of 3.7:1; agitating said reacton mixture during said addition whereby said reaction mixture is maintained substantially uniform; and adding to said reaction mixture the remainder of said tin tetrahalide thereby forming a high yield of said alkyl organotin compound.

References Cited

UNITED STATES PATENTS

| | | | |
|---|---|---|---|
| 2,675,398 | 4/1954 | Ramsden | 260—429.7 |
| 3,085,102 | 4/1963 | Yatagai et al. | 260—429.7 |

TOBIAS E. LEVOW, *Primary Examiner.*

W. F. W. BELLAMY, *Assistant Examiner.*